United States Patent
Stickler

[11] 3,831,983
[45] Aug. 27, 1974

[54] PLUMBING CONNECTION

[76] Inventor: Charles F. Stickler, 57455 Poppy Rd., South Bend, Ind. 46619

[22] Filed: July 20, 1973

[21] Appl. No.: 381,253

[52] U.S. Cl............... 285/12, 285/156, 285/177, 285/334.4, 285/386, 285/392
[51] Int. Cl............................................. F16l 41/00
[58] Field of Search.......... 285/12, 156, 177, 334.4, 285/334.1, 332, 386, 354

[56] References Cited
UNITED STATES PATENTS

| | | | |
|---|---|---|---|
| 2,005,969 | 6/1935 | Cornell | 285/177 |
| 3,126,212 | 3/1964 | Young | 285/12 |
| 3,338,597 | 8/1967 | Mason | 285/177 X |
| 3,381,982 | 5/1968 | Elek | 285/177 X |

*Primary Examiner*—H. Hampton Hunter
*Attorney, Agent, or Firm*—Oltsch & Knoblock

[57] ABSTRACT

A plumbing connection wherein preformed tubes of a selected range of diameters cooperate with a connecting member having a passage of standard diameter. The tubes of all sizes in the selected range have tapered ends, each of whose outer small diameter portions is receivable in said passage and whose innermost large diameter portion is of a diameter greater than the diameter of the passage. Each tube carries slip nuts for pressing said tapered tube ends into circumferential sealing engagement with a connecting member when abutting the large end of a tapered tube portion and screw threaded on said connecting member.

5 Claims, 4 Drawing Figures

PATENTED AUG 27 1974 3,831,983
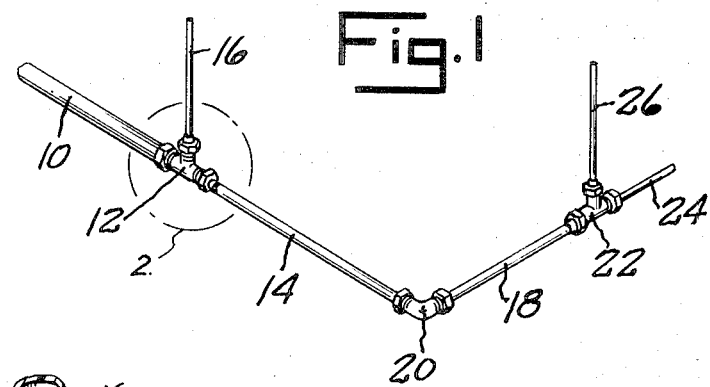
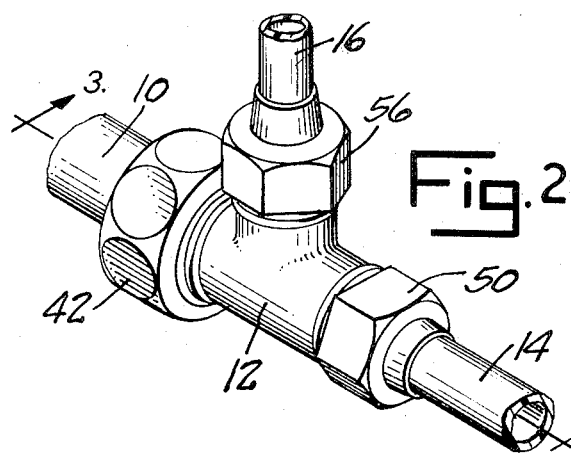
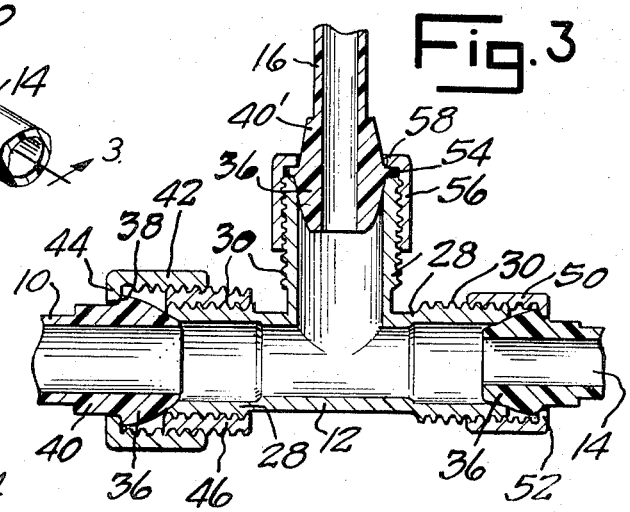
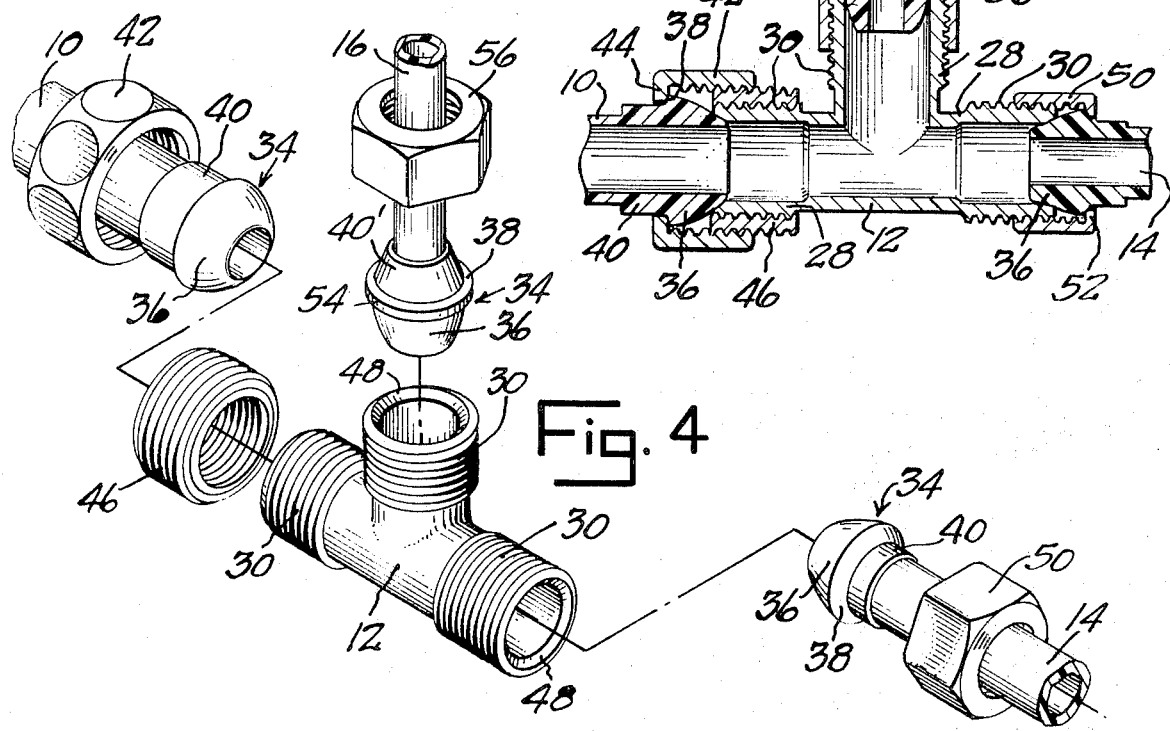

PLUMBING CONNECTION

This invention relates to improvements in plumbing connections, and particularly to connections by means of which tubes or conduits can be connected to each other by unions, T's, L's, and the like, and to fixtures and fittings.

It is common practice in plumbing and other liquid circulating systems to utilize pipes or tubes of different sizes in different parts of the system, depending upon the demands or requirements upon each part of the system. Thus, in household plumbing installations it is quite common to use tubes or pipes of 3/8 inch diameter, 1/2 inch diameter and 5/8 inch diameter at different parts. These component tubes must be connected together by unions, L's, T's, or other fittings, and lead to plumbing fixtures such as faucets. With conventional connectors, this requires the use of a special fitting in each instance, that is, the selection of each fitting of dimensions to accept, join and seal the pipes or tubes of different sizes to be connected thereby. As a result of this requirement, plumbers and pipefitters are required to have available at the job site a very large number of fittings to meet the requirements for different combinations. As an example, with respect to a union, the plumber must have available unions to connect together two 3/8 inch pipes, to connect two 1/2 inch pipes, to connect two 5/8 inch pipes, to connect a 3/8 inch pipe to a 1/2 inch pipe, to connect a 3/8 inch pipe to a 5/8 inch pipe, and to connect a 1/2 inch pipe to a 5/8 inch pipe. Even larger numbers of fittings of other types, such as T's and cross members, are required. Similarly, adapters for different sizes are required with respect to fittings and fixtures, such as faucets. The large number of fittings required present problems of inventory and difficulty in maintaining an adequate stock of all of the different possible variations of fittings. This leads to loss of time, increased expense for performing plumbing services, and other undesirable situations.

It is the primary object of this invention to provide a connector having universal application within a selected range of sizes.

A further object is to provide a plumbing connection of the compression fitting type which provides an effective seal with minimum exertion and expenditure of time, and without requiring preselection of connectors of specific size combinations.

A further object is to provide a connector of a standard size to which as many as three tubes or pipes of different sizes can be connected at will and with minimum adjustment or compensation.

A further object is to provide a plumbing connector with which preformed tube units of different sizes are connectable, each tube having an enlarged end portion terminating in a tapered part whose circumferential dimensions at different points along the length or axial dimension thereof vary within a selected range from a circumferential dimension less than the inner diameter of a fitting of given size to a dimension larger than the inner diameter of said fitting.

Other objects will be apparent from the following specification.

In the drawings:

FIG. 1 is a perspective view illustrating a part of a plumbing or a liquid flow system in which a plurality of tubes or conduits of different sizes are connected.

FIG. 2 is a perspective view of a T-fitting to which tubes or pipes of three different sizes are connected.

FIG. 3 is an axial sectional view taken on line 3—3 of FIG. 2.

FIG. 4 is an exploded view of the various parts comprising the connection illustrated in FIGS. 2 and 3.

Referring to the drawings which illustrate a preferred embodiment of the invention, and particularly to FIG. 1, the numeral 10 designates a large diameter tube or pipe, such as one of 5/8 inch diameter, which tube is connected by a T-fitting 12 to a pipe or tube 14 of intermediate size, such as one of 1/2 inch diameter, and to a second tube 16 of small diameter, such as one of 3/8 inch diameter. The intermediate tube 14 is shown connected to a second intermediate tube 18 by an L or elbow fitting 20. The opposite end of the intermediate tube 18 is connected to another T fitting 22 which may be of the same character or size as the T fitting 12. The T fitting 22 is in turn connected to a small diameter tube 24, and to a second small diameter tube 26.

Each of the fittings or connectors 12, 20, 22, and such other fittings as unions and cross or X-fittings, may be of a standard size, and each is characterized by two or more tubular end portions 28, each of which is externally screw threaded at 30, and by one or more passages or bores 32 which preferably are of the same diameter. Thus, each tubular end portion of each fitting is similar to the other end portions of that fitting and of other fittings used in the system, or that part of the system in which tubes of the selected range of diameters are used.

Each of the fittings or connectors may be formed of metal or of any plastic material suitable to accept liquids within the range of temperatures to which the system is subject. One such plastic is Celon produced by Celanese Corporation of America, an ethylcellulose thermoplastic.

Each of the tubes or conduits may be formed of any suitable material, such as metal, although I prefer to utilize flexible plastic tubes adapted to accommodate flow therein of both cold and hot water in the temperature range to or slightly above 180° F as normally exists in a domestic plumbing system. Tubing of this character may be formed from polybutylene, polyethylene, polyvinylchloride, and other material, such as polyolefins, Each tube is characterized by configured integral or bonded end portions 34 at one or both ends thereof. Each tube end portion 34 includes a tapered end portion 36 extending from the end thereof to a large diameter portion spaced from its end and defining an annular shoulder or abutment 38 between said large diameter portion and a smaller inner part 40. It will be understood, however, that the smaller inner part 40 is optional, and the shoulder 38 may be formed directly between the tube and the large diameter end of the tube end portion 34. The tapered portion 36 is preferably slightly curved longitudinally to be of somewhat bulbous shape.

In the form shown, the large diameter tube 10 has a tapered end portion 36 whose small diameter end is slightly smaller than the diameter of the bore of a fitting or connector, such as the fittings 12, 22 and 20, and the large diameter end of the tapered part 36 is of larger diameter than the outer diameter of the tubular end 28 of the fitting. The inner end portion 40 of the enlargement 34 is preferably of approximately the same diameter as the outer diameter of the fitting end 28 and is substantially cylindrical. The annular shoulder 38 between the tapered part 36 and the part 40 is preferably substantially flat. The tube 10, if provided with enlargements 34 at both ends, is encircled by two slip nuts 42 which face oppositely, that is, with end walls 44 of each disposed innermost. Each end wall 44 has an aperture therein of a diameter slightly greater than the diameter of the tube part 40 so that the nut may have firm abutment circumferentially against the shoulder 38 at its end wall 44. The axial dimension of the inner threaded part of the slip nut 42 is greater than the axial dimension of the tapered part 36 of tube 10, and has an inner thread diameter greater than the diameter of the threaded part 30 of the fitting with which the tube 10 is to be connected. An adapter nut 46 is internally screw threaded to mesh with the threads 30 of the fitting, and is externally screw threaded to mesh with the threads of the nut 42. Thus, when the tube 10 is to be applied to a fitting, an adapter nut 46 is threaded on that fitting to a limit position at which its outer end is substantially flush with the outer end of the threaded fitting portion 28. Thereupon, the tapered end 36 of conduit 10 is inserted into the bore of the fitting at the end thereof, which bore end portion is preferably tapered or frusto-conical at 48. Such taper 48 is preferably provided at the end of each bore of the fitting and serves to orient the tapered enlarged tube part 36 therein. Nut 42 is then advanced, being threaded upon the adapter nut 46, and serves to urge the tapered surface 36 of the tube against the tapered surface 48 of the fitting, and to provide an effective liquid-tight seal thereat.

The tube 14 of intermediate size has a bore of smaller diameter than the fitting, and the tapered end portion 36 thereof is of a diameter less than the bore of the fitting at its small end and of a diameter at its inner end larger than the bore of the fitting and preferably slightly smaller than the diameter of the threaded portion 30 of the fitting. Each tube 14 is encircled by one or two slip nuts 50 having interior screw threads adapted to mesh with the screw thread 30 of the connector or fitting. The end wall 52 of each slip nut is positioned innermost and is provided with an aperture slightly larger than the diameter of the portion 40 of tube 14 and smaller than the diameter of the large inner end of the tapered part 36 so as to circumferentially abut the shoulder 38 of the tube when the parts interfit, as illustrated in FIG. 3. In this arrangement, the tapered end 36 of tube 14 extends into the bore of the fitting to engage the tapered portion 48 of the fitting intermediate the length of the tapered part 36. The screw threaded connection of the slip nut 50 with the threaded end 28 of the fitting urges the tube end 36 into sealing circumferential engagement in the bore of the fitting to provide a liquid-tight seal therewith.

The small diameter tube 16 is here illustrated with end portion 34 of slightly different configuration than the other tubes. Thus, the tapered end portion 36 thereof has a small diameter end substantially smaller than the bore of the fitting and a large diameter end portion which is slightly larger than the diameter of the bore of the fitting. A circumferential rib 54 projects outwardly from the large diameter end of the tapered part 36 of the tube, and the part 34 inwardly from the tib 54 may be of frusto-conical configuration at 40'. Rib 54 will preferably be of a diameter slightly less than the root diameter of the threads 30 of the fitting. One or a pair of slip nuts 56 encircles each tube 16, each having its end wall 58 positioned innermost and provided with a bore of a diameter less than the outer diameter of the rib 54 and preferably slightly greater than the largest diameter of the part 40'. Each slip nut 56 is of a size to have screw threaded engagement with the threads 30 of the fitting, and, as it advances, its end wall 58 bears against the circumferential rib 54 of the tube 16 and urges the large diameter of the end portion 36 of the tube into continuous sealing engagement with the portion 48 of the bore of the fitting.

Assuming that each of the tubes of a given group, such as 3/8 inch, 1/2 inch and 5/8 inch, is preformed with slip nuts and enlarged tapered ends, is available in the various lengths required for a plumbing or piping installation, it will be apparent that the various fittings, such as unions, T's, L's and cross fittings, can be of standard sizes and any combination of connections of the three different diameters of tubes, such as 10, 14 and 16, can be connected thereto. This eliminates requirement for selection of special fittings at each joint or connections of the system which heretofore has been necessary to accommodate the connection of tubes of different sizes. Thus, each of the small tube 16 and the intermediate size tube 14 can be connected to a fitting by simply applying the end of the tube to the end of the fitting and screw threading the slip nut associated with that tube upon a thread 30 of the fitting. Where a large diameter tube 10 is used, the user need only apply an adapter nut 46 to the end of the fitting at which the large tube 10 is to be connected, and thereupon the end of the large tube can be applied to the fitting and the nut 42 can be threaded upon the adapter nut 46. This arrangement is of particular value in connection with the installation of plumbing systems in mobile homes, travel trailers and modular prefabricated buildings. Thus, a factory producing such products can order tubing in different lengths and of different sizes required for the product and can order standard fittings and the adapter nuts 46 and thereby facilitate the installation of the plumbing and greatly conserve the time now required by installers of plumbing systems using conventional tubing and fittings.

The enlarged end portions of each tube may be formed in any suitable manner, as by bonding or fusing to a tube of selected length a ring of a size and configuration required for that tubing. Such bonding can be achieved by the use of cements or solvents, as with polyvinylchloride, or by heat fusion in instances in which the tubing and the configured ring are formed of the thermoplastic materials herein mentioned.

While the preferred embodiment of the invention has been illustrated and described, it will be understood that changes in the construction may be made within the scope of the appended claims without departing from the spirit of the invention.

What I claim is:

1. A plumbing connection between a tube and a connected member such as a fitting or a fixture, comprising a preformed tube having an enlarged end portion and a slip nut encircling said tube, a connected member having a substantially uniform passage therethrough and externally screw threaded neck portions at each end of said passage, said neck portions being of the same diameter, said tube being selected from a group of tubes of diameters within a selected range, the enlarged end portion of each tube of said group being tapered and having a terminal portion of a diameter less than the diameter of the passage of said connected member and a large inner portion of a diameter greater than the diameter of the passage of said connected member, whereby all tubes of said group are adapted for wedged fit in an end of a passage of said connected member, the enlarged end portion of each tube having a circumferential inner shoulder, said slip nut having an apertured end wall abutting said tube shoulder and having an open end projecting beyond the enlarged portion of the tube when its end wall abuts said shoulder, the slip nuts of the small tubes of said group being adapted to be threaded on a neck of said connecting member to advance the tapered portion of the associated tube into wedged sealed circumferential engagement with said connecting member at the end of a passage, and means for adapting connection of the slip nut of the largest tube to maintain sealed circumferential engagement of its tapered portion with the end of a passage.

2. A plumbing connection as defined in claim 1, wherein the large diameter end of the tapered portion of the largest tube is larger than the outer diameter of the threaded neck of the fitting to which it is connected, and said adapting means comprises an annulus interiorly threaded upon said neck and exteriorly threaded into the slip nut of said largest tube.

3. A plumbing connection as defined in claim 1, wherein said tubes and the enlarged end portions thereof are formed of flexible thermoplastic material capable of withstanding liquid at temperatures in the order of 180° F.

4. A plumbing connection as defined in claim 1 wherein each tube and its enlarged end portion is integral.

5. A plumbing connection as defined in claim 1 wherein each passage of said connecting member terminates in a tapered enlarged portion for receiving the tapered end portion of a tube.

* * * * *